UNITED STATES PATENT OFFICE.

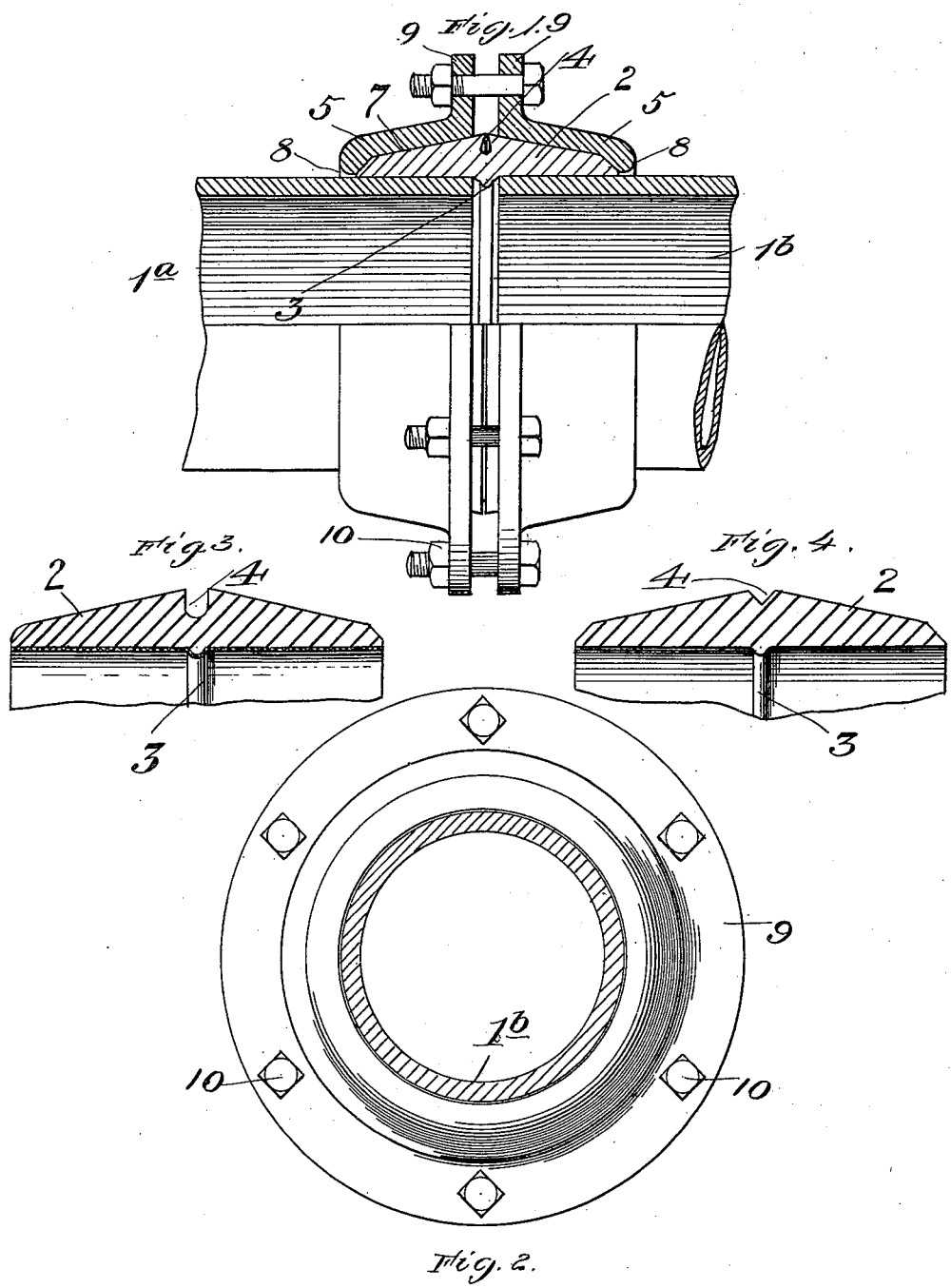

JACOB M. OLINGER, OF SPRINGFIELD, OHIO.

PIPE-COUPLING.

SPECIFICATION forming part of Letters Patent No. 654,073, dated July 17, 1900.

Application filed October 25, 1899. Serial No. 734,716. (No model.)

*To all whom it may concern:*

Be it known that I, JACOB M. OLINGER, a citizen of the United States, residing at Springfield, in the county of Clark and State of Ohio, have invented new and useful Improvements in Pipe-Couplings, of which the following is a specification.

My invention relates to pipe-couplings; and the objects of the same are to provide a simple and efficient means for making a tight joint between two plain pipe ends.

The invention consists in the novel construction and combination of parts hereinafter fully described and claimed.

In the accompanying drawings, Figure 1 is a partial longitudinal section of two pieces of pipe secured together by my coupling. Fig. 2 is an end view of the coupling, the pipe being shown in section. Fig. 3 is a longitudinal section through the rubber jacket or packing. Fig. 4 is a similar view of another form of jacket.

Like numerals of reference designate like parts wherever they occur in the different views of the drawings.

The numerals 1ª 1ᵇ designate the two sections of pipe, and, as shown, these pipes have plain unthreaded end portions and square ends. Fitted over the two sections of pipe is a rubber jacket or packing 2. This jacket is in the form of a sleeve, having an interior annular rib 3 substantially at the longitudinal center of the sleeve and an annular circumferential groove 4 passing around the central exterior surface of said sleeve in substantially the same plane with the rib 3. The rubber jacket 2 is thicker at the center than at its ends, or the outer surface tapers from the groove 4 toward both ends, for a purpose which will presently appear. As shown in Fig. 3, the jacket is provided with an asbestos lining; but other materials may be used for lining said jacket when the pipes to be joined are intended to be used for conveying materials deleterious to rubber.

The two flanged rings or clamps 5 5 have an interior configuration which conforms substantially to the outer surface of the jacket 2, the interior bore at the ends of the clamps being of a size to nicely fit the pipe to be coupled. The interior walls 7 of these clamps incline from the outer edges 8 to the flanges 9. A number of bolts 10 pass through the flanges 9 for holding the two sections of the pipe together.

The manner of using my device is obvious. The rubber jacket is placed over the end of one section of the pipe and the other section of the pipe is then forced into the opposite end of the jacket. The metal clamps are then brought together and the bolts 10 inserted through the flanges 9. As the bolts are tightened up the clamps move on the surface of the rubber jacket without crimping or buckling it, owing to the circumferential groove 4, which may close at the outer surface as greater pressure is applied to bring the clamps together. The interior rib in the meantime is clamped tightly between the two meeting ends of the pipe-section and a tight joint is insured. As the clamps move toward each other by the stress of the bolts 10 the rubber jacket 2 is somewhat shortened and compressed until the rubber is very dense and hugs the pipe-sections with great force, so that a close and substantial joint is formed and one which will not readily separate.

It will be noticed that the circumferential groove 4 is shown in Fig. 4 as being V-shaped in cross-section, and it will be obvious that the shape of the groove may be varied without departing from the spirit and scope of the invention.

Having thus fully described my invention, what I claim is—

1. A pipe-coupling consisting of a rubber packing-ring or jacket having an interior annular rib and an exterior circumferential groove, said rib and groove being in the same plane centrally of the jacket, and two coupling-clamps surrounding the jacket and designed to compress the jacket both peripherally and longitudinally of the pipe when drawn together by the coupling-bolts, and to obviate crimping or buckling of the jacket, substantially as described.

2. A pipe-coupling comprising a flexible rubber packing-ring or jacket having a thickened central portion and tapering outer edges, an annular central interior rib and a circumferential exterior central groove, a pair of flanged clamps surrounding said jacket, said clamps having an interior surface which substantially conforms to the outer surface of the jacket, the ends of the clamps fitting the pipe-sections to hold the jacket between them, and coupling-bolts passing through the flanges, substantially as described.

In testimony whereof I have hereunto set my hand in presence of two subscribing witnesses.

JACOB M. OLINGER.

Witnesses:
MARY E. OLINGER,
C. S. OLINGER.